(No Model.)

J. KELK.
BIRD INSECT CATCHER AND TRAP.

No. 261,853. Patented Aug. 1, 1882.

UNITED STATES PATENT OFFICE.

JAMES KELK, OF HAMILTON, ONTARIO, CANADA.

BIRD-INSECT CATCHER AND TRAP.

SPECIFICATION forming part of Letters Patent No. 261,853, dated August 1, 1882.

Application filed March 28, 1882. (No model.) Patented in Canada December 14, 1881, No. 13,825.

*To all whom it may concern:*

Be it known that I, JAMES KELK, of the city of Hamilton, in the county of Wentworth, in the Province of Ontario, Canada, have invented a certain new and useful Bird-Insect Catcher and Trap; and I do hereby declare that the following is a full, clear, and exact description of the construction and operation of the same.

It is well known that caged birds are liable to attacks of minute insects, which prey upon them during the night and leave them during the day, causing serious injury to the health and appearance of birds; and my invention relates to a very simple but effective device for trapping and catching such insects, so that by its use an infected cage can very soon be rid of the pests.

Figure 1:
Figure 3:
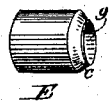
Figure 2:
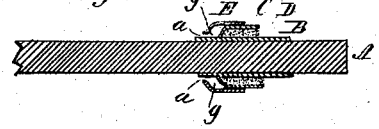

By reference to the drawings forming part of this specification, it will be seen that Figure 1 is a perspective view of the device. Fig. 2 is a section of the same. Fig. 3 is a perspective view of the rear portion of it.

A represents a perch. The ends are grooved and impinge on the wires of a cage wherein it is placed.

B is a cylinder, preferably of tin, made to surround the perch A and fit snug to it. An annular band, C, somewhat larger in diameter than the said cylinder, is made to surround it, the rear portion of which is bent inward and soldered to the cylinder, as shown at the longitudinal section in Fig. 2. This leaves the front part with an annular space or recess, D, between the said band or ring, which may be filled with any composition disagreeable to insects, such as soap, insect-powder, &c.

A cylindrical cap, E, is made to slide and fit on the rear half of the ring C, and is provided with an inwardly-turned flange, c, as shown at Fig. 3, leaving an opening a little larger than the cylinder B, which acts as an entrance, a, to the small annular recess g, which is between the end of the cap E and rear part of the ring C.

The operation of the device, which is placed on the perch within, say, half an inch of the end, as shown at Fig. 1, is as follows: When the insects come out of their hiding-places and go upon the perch to attack the bird they crawl on until they come to the recess D, which is filled with some substance disagreeable to them, and instead of crawling over it they turn back. Thus it will be seen that insects cannot attack the bird on the perch. If, however, insects get upon the bird when it is off the perch, after feeding upon it during the night they will at daylight leave the bird for their hiding-place and crawl along the perch until they come to the trap, when they will enter the annular space a into the recess g, as shown at section, Fig. 2, and remain there.

Any time during the day the perch and trap can easily be removed and the insects destroyed.

What I claim as my invention is—

1. A perch for a bird-cage, provided near its ends with annular bands C, having annular recesses D formed upon them, the recesses filled with a noxious compound to prevent insects from getting on a bird while on the perch, substantially as and for the purpose specified.

2. In combination with the perch A, cylinder B, and ring C, the cap E, forming recess g, substantially as and for the purpose specified.

Dated at Hamilton, Ontario, Canada, this 18th day of March, A. D. 1882.

JAMES KELK.

In presence of—
W. BRUCE,
CHAS. LAING.